United States Patent
Tomita et al.

(10) Patent No.: US 9,450,464 B2
(45) Date of Patent: Sep. 20, 2016

(54) ELECTRICAL COLLECTING AND DISTRIBUTING RING

(71) Applicant: Hitachi Metals, Ltd., Tokyo (JP)

(72) Inventors: Kazuhiko Tomita, Mito (JP); Kenichi Egami, Kitaibaraki (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 14/260,946

(22) Filed: Apr. 24, 2014

(65) Prior Publication Data

US 2014/0319945 A1 Oct. 30, 2014

(30) Foreign Application Priority Data

Apr. 25, 2013 (JP) .................................. 2013-092494

(51) Int. Cl.
*H02K 3/52* (2006.01)
(52) U.S. Cl.
CPC ........... *H02K 3/522* (2013.01); *H02K 2203/09* (2013.01)
(58) Field of Classification Search
CPC .................................. H02K 3/12; H02K 3/28
USPC ........................................................... 310/71
See application file for complete search history.

(56) References Cited

U.S. PATENT DOCUMENTS

| 6,930,434 | B1 * | 8/2005 | Spencer et al. ............... 310/270 |
| 2009/0256439 | A1 * | 10/2009 | Inoue et al. ..................... 310/71 |
| 2012/0112580 | A1 * | 5/2012 | Sato et al. ....................... 310/71 |

FOREIGN PATENT DOCUMENTS

| JP | 2003324887 A | 11/2003 |
| JP | 2005-160137 | 6/2005 |
| JP | 2005-229677 | 8/2005 |
| JP | 2010246324 A | 10/2010 |
| JP | 2012257366 A | 12/2012 |

OTHER PUBLICATIONS

Japanese Office Action for corresponding Japanese Patent Application No. 2013-092494 dated Apr. 19, 2016 and English translation thereof.

* cited by examiner

*Primary Examiner* — Terrance Kenerly
(74) *Attorney, Agent, or Firm* — Roberts Mlotkowski Safran Cole & Calderon, PC (57) ABSTRACT

An electrical collecting and distributing ring is composed of an annular bus ring including a plurality of terminals and a plurality of circular arc portions therebetween, respectively. The plurality of terminals include respective one pair of extended portions, which extend in a radial direction of the circular arc portions to clamp an end therebetween of a winding, and a respective curved portion, which is formed between the respective one pair of extended portions. The electrical conducting member is formed with depressed portions in the curved portions, respectively. The depressed portions are thinned in thicknesses in radial directions of the curved portions, respectively. The terminals and the ends of the winding are connected together by caulking the extended portions with the ends of the winding clamped between the extended portions, respectively.

4 Claims, 7 Drawing Sheets

ELECTRICAL COLLECTING AND DISTRIBUTING RING

The present application is based on Japanese patent application No. 2013-092494 filed on Apr. 25, 2013, the entire contents of which are incorporated herein by reference.

BACKGROUND OF THE INVENTION

1. Field of the Invention

This invention relates to an electrical collecting and distributing ring, which performs electrical collection and distribution to a winding wound around a plurality of teeth.

2. Description of the Related Art

Conventionally, an electrical collecting and distributing ring is known that is used in a motor, to provide an electric current from an inverter to a winding wound around a plurality of annularly arranged teeth (Refer to e.g. JP-A-2005-160137 and JP-A-2005-229677).

The bus rings disclosed in JP-A-2005-160137 and JP-A-2005-229677 are formed in a ring shape by bending a single linear electrical conductor, and are provided with equally spaced terminals at a plurality of locations respectively in a circumferential direction of the bus ring, so that the terminals are connected to each phase winding, respectively, of the motor. These terminals are each formed by bending the linear electrical conductor into such a U shape as to project inward in a radial direction of the bus ring. In the bus ring disclosed in JP-A-2005-160137, the terminals and the motor windings are electrically connected together by heat caulking (fusing).

SUMMARY OF THE INVENTION

In the bus rings disclosed in JP-A-2005-160137 and JP-A-2005-229677, when the linear electrical conductor is bent into the U shape to form the terminals, great bending stress acts on the terminals, therefore being likely to crack respective tips of the terminals.

Accordingly, it is an object of the present invention to provide an the electrical collecting and distributing ring, which is capable of suppressing cracks forming when connected with a coil winding.

According to an embodiment of the invention, an electrical collecting and distributing ring comprises:

an annular bus ring for performing electrical collection and distribution to a polyphase winding wound around a plurality of annularly arranged teeth, the bus ring including a plurality of terminals and a plurality of circular arc portions therebetween, respectively, formed by bending a linear electrical conducting member, so that the plurality of terminals are connected to ends, respectively, of the winding, while being connected together in a circumferential direction by the plurality of circular arc portions therebetween, respectively, wherein the plurality of terminals include respective one pair of extended portions, which extend in a radial direction of the circular arc portions to clamp the end therebetween of the winding, and a respective curved portion, which is formed between the respective one pair of extended portions, wherein the electrical conducting member is formed with depressed portions in the curved portions, respectively, the depressed portions being thinned in thicknesses in radial directions of the curved portions, respectively, wherein the terminals and the ends of the winding are connected together by caulking the extended portions with the ends of the winding clamped between the extended portions, respectively.

In the embodiment, the following modifications and changes may be made.

(i) The depressed portions are formed by flattening the electrical conducting member in the radial directions of the curved portions, respectively.

(ii) The respective one pair of extended portions of the terminals and the end therebetween of the winding are connected together by heat caulking.

(Points of the Invention)

The electrical collecting and distributing ring according to the present invention allows for suppressing cracks forming when connected with the coil winding.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

First Embodiment

Figure 1:
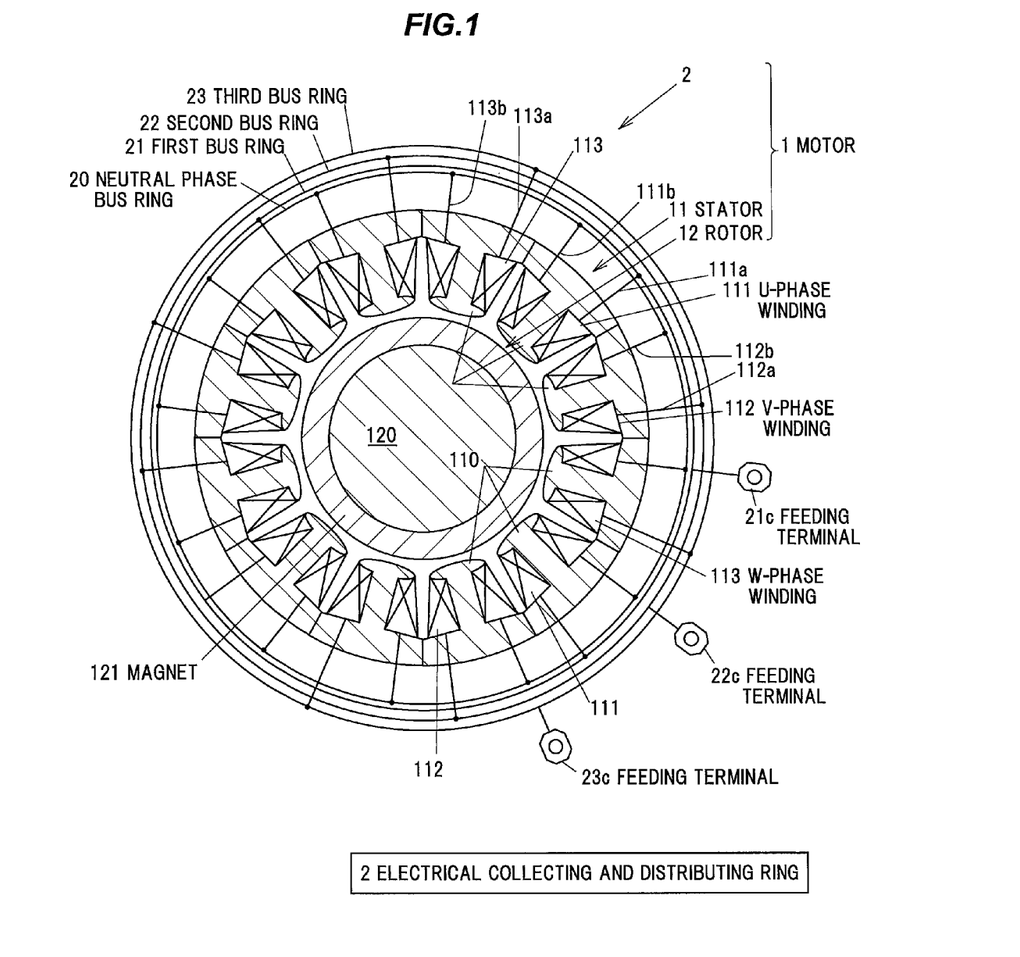
FIG. 1 is a schematic diagram showing a schematic configuration example of an electric motor having an electrical collecting and distributing ring in a first embodiment according to the invention.

FIG. 1 is a schematic diagram showing a schematic configuration example of an electric motor having an electrical collecting and distributing ring 2 in a first embodiment according to the invention.

(Configuration of the Motor 1)

This motor 1 comprises a stator 11, which is a stationary part, a rotor 12, which is a rotating part, and the electrical collecting and distributing ring 2, which distributes a driving current to the stator 11.

The stator 11 is made of a magnetic material, and comprises polyphase windings 111, 112 and 113 wound around a plurality of annularly arranged teeth 110. Each tooth 110 is wound with a U phase winding 111, a V phase winding 112 or a W phase winding 113 therearound. The U phase winding 111, the V phase winding 112 and the W phase winding 113 are, in turn, arranged in a circumferential direction (clockwise direction in FIG. 1) of the stator 11.

One end of the U phase winding 111 is configured as a first lead wire 111a, while the other end of the U phase winding 111 is configured as a second lead wire 111b. Likewise, one end of the V phase winding 112 is configured as a first lead wire 112a, while the other end of the V phase winding 112 is configured as a second lead wire 112b. Also, one end of the W phase winding 113 is configured as a first lead wire 113a, while the other end of the W phase winding 113 is configured as a second lead wire 113b.

The rotor 12 includes a shaft 120, which is supported pivotally and coaxially with the stator 11 by a bearing not shown, and a magnet 121 having and a plurality of magnetic poles, which are fixed around an outer surface of the shaft 120.

The electric collecting and distributing ring 2 comprises first, second and third bus rings 21, 22 and 23 and a neutral phase bus ring 20. The first, second and third bus rings 21, 22 and 23 distribute a driving current output from an inverter not shown, to the U, V and W phase windings 111, 112 and 113, respectively. At ends of the first, second and third bus rings 21, 22 and 23, feeding terminals 21c, 22c and 23c, respectively, which are provided with U, V and W phase driving currents, respectively, are thermally caulked.

The first bus ring 21 is connected with the first lead wire 111a of the U phase winding 111. The second bus ring 22 is connected with the first lead wire 112a of the V phase winding 112. The third bus ring 23 is connected with the first lead wire 113a of the W phase winding 113.

The neutral phase bus ring 20 is connected with the second lead wire 111b of the U phase winding 111, the second lead wire 112b of the V phase winding 112 and the second lead wire 113b of the W phase winding 113. The first, second and third bus rings 21, 22 and 23 and the neutral phase bus ring 20 are arranged coaxially with the stator 11.

The U phase winding 111, the V phase winding 112 and the W phase winding 113 are provided with sine wave driving currents, respectively, each being 120 degrees out of phase from the others, from the inverter not shown, to produce a rotating magnetic field in the stator 11. The magnet 121 is acted on by a rotational force resulting from attractive and repulsive forces due to the rotating magnetic field, and this rotational force results in a rotation of the shaft 120.

(Configuration of the Electrical Collecting and Distributing Ring 2)

Figure 2:
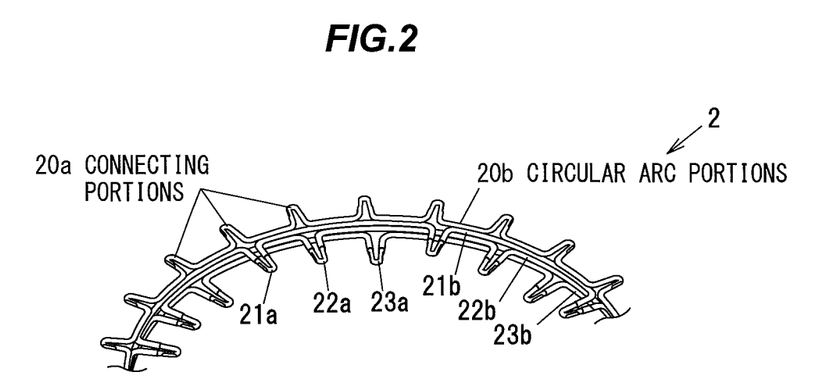
FIG. 2 is a partially enlarged view showing first, second, and third bus rings and a neutral phase bus ring in the first embodiment.

FIG. 2 is a partially enlarged view showing the first, second and third bus rings 21, 22 and 23 and the neutral phase bus ring 20 in the first embodiment.

The first, second and third bus rings 21, 22 and 23 and the neutral phase bus ring 20 are formed in a ring shape and arranged on top of and parallel to each other in an axial direction of the electrical collecting and distributing ring 2. In this embodiment, in FIG. 2, there are arranged, in turn, from top in the axial direction of the electrical collecting and distributing ring 2, the neutral phase bus ring 20, the first bus ring 21, the second bus ring 22 and the third bus ring 23.

The first bus ring 21 includes a plurality of connecting portions 21a as a plurality of terminals, which are formed at a plurality of locations respectively in the circumferential direction of the first bus ring 21 so as to be connected to the end (first lead wire 111a) of the U phase winding 111, and a plurality of circular arc portions 21b, which connect the plurality of connecting portions 21a together in the circumferential direction of the first bus ring 21. In this embodiment, the plurality of connecting portions 21a each extend inward in a radial direction of the plurality of circular arc portions 21b.

Likewise, the second bus ring 22 includes a plurality of connecting portions 22a as a plurality of terminals, which are formed at a plurality of locations respectively in the circumferential direction of the second bus ring 22 so as to be connected to the end (first lead wire 112a) of the V phase winding 112, and a plurality of circular arc portions 22b, which connect the plurality of connecting portions 22a together in the circumferential direction of the second bus ring 22. In this embodiment, the plurality of connecting portions 22a each extend inward in a radial direction of the plurality of circular arc portions 22b.

Likewise, the third bus ring 23 includes a plurality of connecting portions 23a as a plurality of terminals, which are formed at a plurality of locations respectively in the circumferential direction of the third bus ring 23 so as to be connected to the end (first lead wire 113a) of the W phase winding 113, and a plurality of circular arc portions 23b, which connect the plurality of connecting portions 23a together in the circumferential direction of the third bus ring 23. In this embodiment, the plurality of connecting portions 23a each extend inward in a radial direction of the plurality of circular arc portions 23b.

The neutral phase bus ring 20 includes a plurality of connecting portions 20a, which are formed at a plurality of locations respectively in the circumferential direction of the neutral phase bus ring 20 so as to be connected to the respective second lead wires 111b, 112b and 113b of the U, V and W phase windings 111, 112 and 113, and a plurality of circular arc portions 20b, which are formed between the plurality of connecting portions 20a, respectively. In this embodiment, the connecting portions 20a each extend outward in a radial direction of the circular arc portions 20b. That is, the respective connecting portions 21a, 22a and 23a of the first, second and third bus rings 21, 22 and 23 each extend inward in the respective radial directions of the circular arc portions 21b, 22b and 23b, respectively, and the connecting portions 20a of the neutral phase bus ring 20 each extend outward in the radial direction of the circular arc portions 20b.

The first, second and third bus rings 21, 22 and 23 are coated with an electrical insulator to be described later, whereas the neutral phase bus ring 20 is electrically uninsulated. The respective connecting portions 21a, 22a and 23a of the first, second and third bus rings 21, 22 and 23 are formed for portions with the electrical insulator removed therefrom. Note that, of the first, second and third bus rings 21, 22 and 23 and the neutral phase bus ring 20, in order to ensure the electrical insulation therebetween, at least one of the two bus rings on top of each other in the axial direction thereof may be coated with the electrical insulator. That is, the two electrically uninsulated bus rings may not be on top of each other.

Because the first, second and third bus rings 21, 22 and 23 are identically formed, the first bus ring 21 is taken as an example, and described in more detail with reference to FIGS. 3 and 4.

(Configuration of the Connecting Portion 21a of the First Bus Ring 21)

Figure 3A:
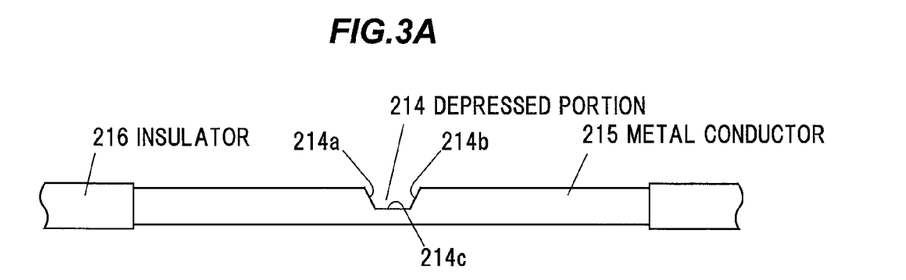
FIG. 3A is a top view showing a connecting portion of the first bus ring in the first embodiment, before formation of the connecting portion.
Figure 3B:
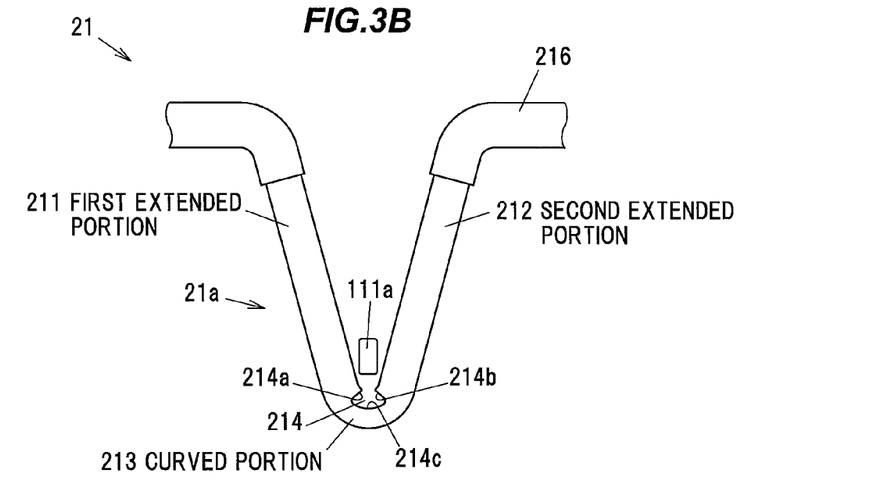
FIG. 3B is a top view showing the connecting portion of the first bus ring in the first embodiment, when a first lead wire is inserted in the connecting portion.

FIG. 3A is a top view showing the connecting portion 21a of the first bus ring 21 in the first embodiment, before formation of the connecting portion 21a. FIG. 3B is a top view showing the connecting portion 21a of the first bus ring 21 in the first embodiment, when the first lead wire 111a is inserted in the connecting portion 21a. FIG. 3C is a top view showing the connecting portion 21a of the first bus ring 21 in the first embodiment, when the first lead wire 111a and the connecting portion 21a are connected together by heat caulking. FIG. 4A is a perspective view showing one example of a forming method for a depressed portion 214 in a constituent electrical conducting member of the first bus ring 21, FIG. 4B is a top view for FIG. 4A, and FIG. 4C is a side view for FIG. 4A.

The first bus ring 21 is formed of a linear electrical conducting member comprising a metal conductor 215, which is made of a metal having a good electrical conductivity such as copper, and an electrical insulator 216, which is made of an insulative resin, and which coats the metal conductor 215. The first bus ring 21 includes a plurality of connecting portions 21a and a plurality of circular arc portions 21b therebetween, respectively, (see FIG. 2), formed by bending that metal conductor 215. In this embodiment, the metal conductor 215 is round in cross section shape.

The plurality of connecting portions 21a integrally include respective one pair of extended portions (first extended portion 211 and second extended portion 212), which extend in the radial direction of the circular arc portions 21b to clamp the first lead wire 111a therebetween, and a respective curved portion 213, which is formed between the first extended portion 211 and the second extended portion 212.

The curved portion 213 is formed with a depressed portion 214, which is thinned in thickness in a radial direction of the curved portion 213. The depressed portion 214 is surrounded on three sides by one pair of opposite tapered surfaces (first tapered surface 214a and second tapered surface 214b), and a bottom surface 214c, which is formed between the first tapered surface 214a and the second tapered surface 214b, and the depressed portion 214 is open toward the first lead wire 111a.

Figure 4A:
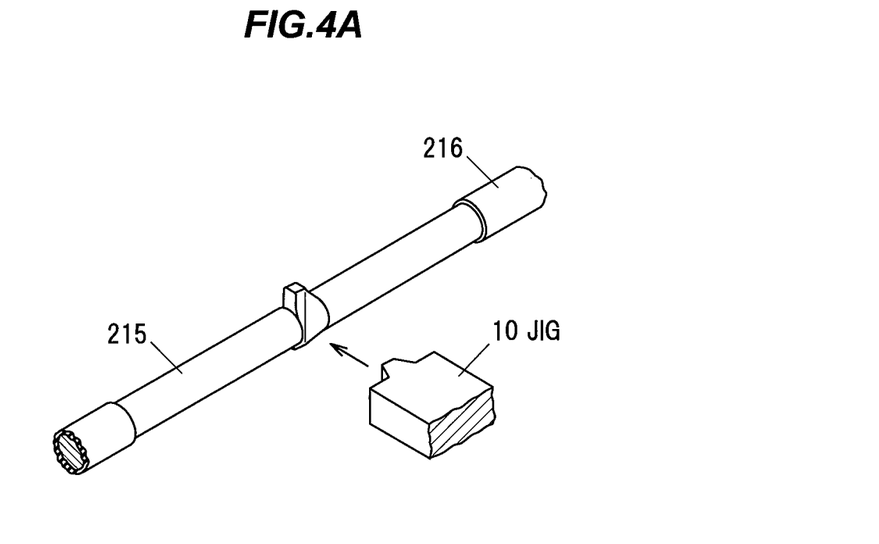
FIG. 4A is a perspective view showing one example of a forming method for a depressed portion in a constituent electrical conducting member of the first bus ring.

As shown in FIG. 4A, the depressed portion 214 is formed by pressing a jig 10 against a portion to be curved to form the curved portion 213 of the metal conductor 215. More specifically, the depressed portion 214 is formed by flattening the metal conductor 215 in the radial direction of the curved portion 213. Incidentally, the depressed portion 214 may be formed by grinding the metal conductor 215. In other words, the depressed portion 214 may be a notch.

The curved portion 213 is formed by bending (curving) the metal conductor 215 at the depressed portion 214 being taken as the center. At this point, the first tapered surface 214a and the second tapered surface 214b are each oriented toward the bottom surface 214c. The bottom surface 214c is curved toward the first lead wire 111a to form a curved surface.

The connecting portion 21a and the first lead wire 111a are connected together by applying pressure with one pair of electrodes (not shown) to the first extended portion 211 and the second extended portion 212 and bringing the first extended portion 211 and the second extended portion 212 into contact with the first lead wire 111a. In other words, the connecting portion 21a and the first lead wire 111a are connected together by caulking the first extended portion 211 and the second extended portion 212 with the first lead wire 111a clamped between the first extended portion 211 and the second extended portion 212. In this embodiment, the connecting portion 21a and the first lead wire 111a are connected together by heat caulking (fusing) welding the first extended portion 211 and the second extended portion 212 and the first lead wire 111a with Joule heat produced by electric current flowing in the one pair of electrodes.

Figure 3C:
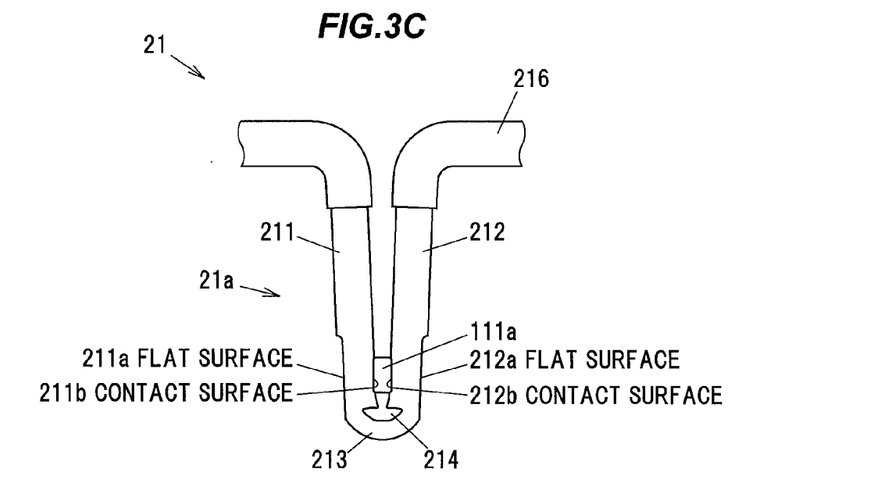
FIG. 3C is a top view showing the connecting portion of the first bus ring in the first embodiment, when the first lead wire and the connecting portion are connected together by heat caulking.
Figure 4B:
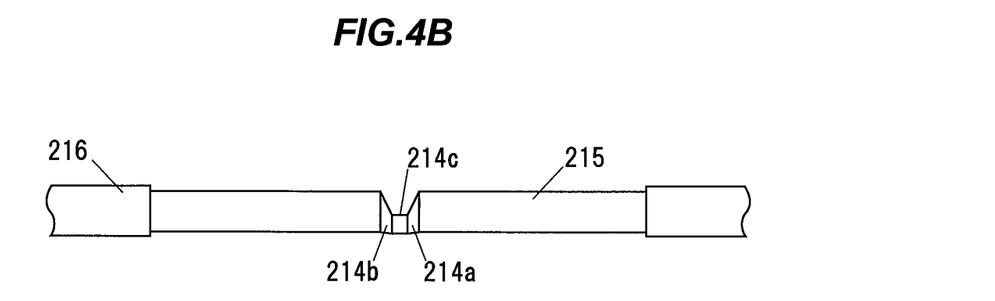
FIG. 4B is a top view for FIG. 4A.
Figure 4C:
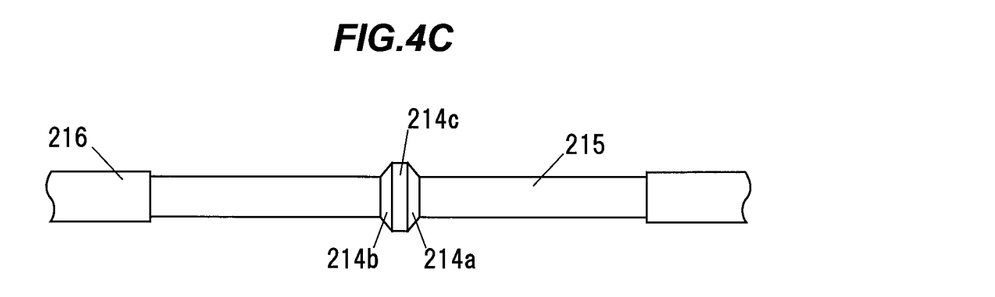
FIG. 4C is a side view for FIG. 4A.

With the one pair of electrodes, external pressure is applied to the first extended portion 211 and the second extended portion 212, resulting in flat surfaces 211a and 212a therein, as shown in FIG. 3C. This applied pressure brings the first lead wire 111a into contact with each of the first extended portion 211 and the second extended portion 212. The first extended portion 211 is formed with a contact surface 211b, which is opposite the flat surface 211a so as to face the first lead wire 111a and come into surface contact with the first lead wire 111a. Likewise, the second extended portion 212 is formed with a contact surface 212b, which is opposite the flat surface 212a so as to face the first lead wire 111a and come into surface contact with the first lead wire 111a.

The first extended portion 211 is heated by electric current flowing in the one pair of electrodes, and the first extended portion 211 including the flat surface 211a and the contact surface 211b, and the first lead wire 111a are joined together by heat caulking. Likewise, the second extended portion 212 including the flat surface 212a and the contact surface 212b, and the first lead wire 111a are joined together by heat caulking. The first extended portion 211 and the second extended portion 212 are joined with the first lead wire 111a so as to be displaced close to each other. As a result, the first lead wire 111a and the connecting portion 21a are electrically connected together.

The connecting portion 22a of the second bus ring 22 and the connecting portion 23a of the third bus ring 23 are also configured in the same manner as the aforementioned connecting portion 21a of the first bus ring 21. Also, the connecting portion 20a of the neutral phase bus ring 20 is configured in the same manner as the connecting portions 21a, 22a and 23a of the first, second and third bus rings 21, 22 and 23.

Comparative Example

Figure 5A:
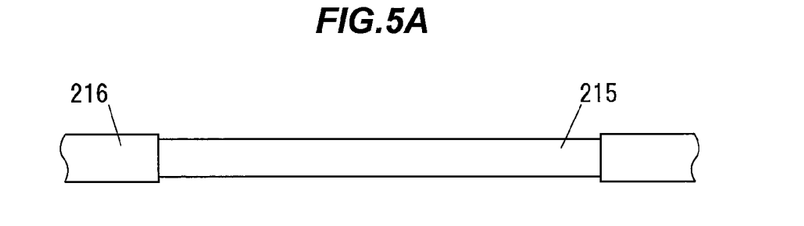
FIG. 5A is a top view showing a first bus ring in a comparative example to the present invention, before formation of a connecting portion.
Figure 5B:
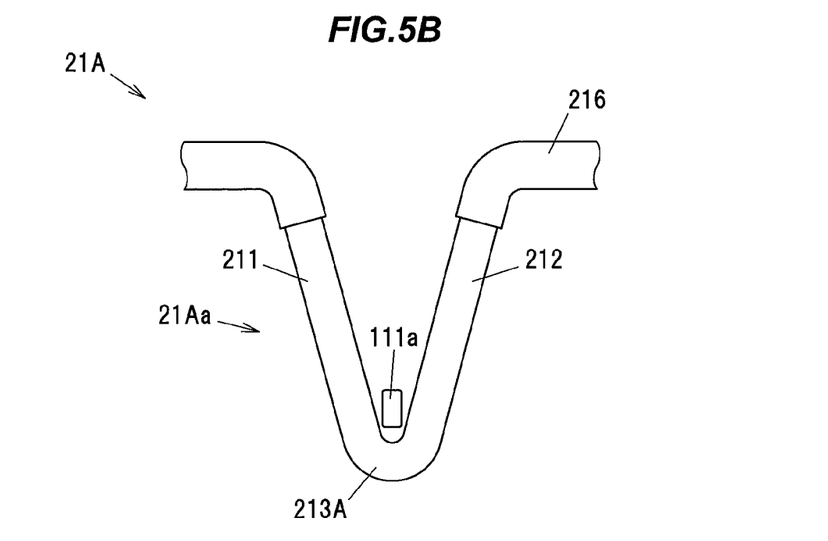
FIG. 5B is a top view showing the first bus ring in the comparative example to the present invention, when a first lead wire is inserted in the connecting portion.
Figure 5C:
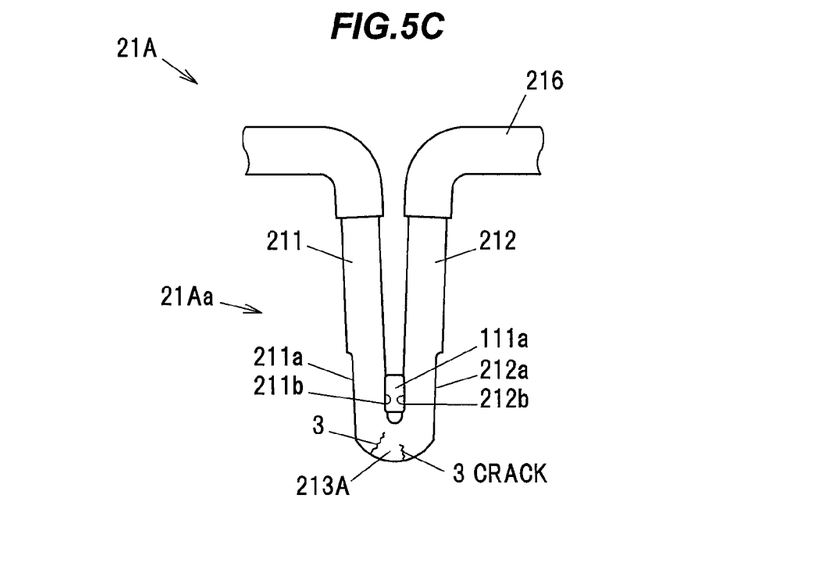
FIG. 5C is a top view showing the first bus ring in the comparative example to the present invention, when the first lead wire and the connecting portion are connected together by heat caulking.

FIG. 5A is a top view showing a first bus ring 21A in a comparative example to the present invention, before formation of a connecting portion 21Aa. FIG. 5B is a top view showing the first bus ring 21A in the comparative example to the present invention, when a first lead wire is inserted in the connecting portion 21Aa. FIG. 5C is a top view showing the first bus ring 21A in the comparative example to the present invention, when the first lead wire 111a and the connecting portion 21Aa are connected together by heat caulking.

The connecting portion 21Aa of the first bus ring 21A in this comparative example comprises a curved portion 213A, which is different in shape from the curved portion 213 of the connecting portion 21a in the first embodiment. In FIGS. 5A to 5C, elements having substantially the same functions as those described for the first bus ring 21 in the first embodiment are given common numerals or characters, and duplicated descriptions thereof are omitted.

No depressed portion is formed in the curved portion 213A of the connecting portion 21Aa of the first bus ring 21A in this comparative example. That is, the curved portion 213A is formed by simply bending (curving) the linear metal conductor 215. Accordingly, since the curved portion 213A has substantially the same thickness in the radial direction of the curved portion 213A as the diameter of the metal conductor 215, the portion 213A is acted on by a greater force, when bent, than a force by which the curved portion 213 in the first embodiment is acted on.

Further, when the first extended portion 211 and the second extended portion 212, and the first lead wire 111a are thermally caulked to displace the first extended portion 211 and the second extended portion 212 close to each other, the inner side (the first lead wire 111a side) of the curved portion 213A is compressed, while the outer side thereof is tensioned toward the first extended portion 211 and the second extended portion 212. These compressive stress and tensile stress result in cracks 3 in the curved portion 213A, as shown in FIG. 5C.

Functions and Advantageous Effects of the First Embodiment

The above described embodiment has the following functions and advantageous effects.

(1) The curved portion 213 of the metal conductor 215 is formed with the depressed portion 214, which is thinned in thickness in the radial direction of the curved portion 213. Therefore, when the metal conductor 215 is bent, the force by which the curved portion 213 is acted on can be reduced, as compared with when no depressed portion 214 is formed. This allows for reducing compressive stress or tensile stress acting on the outer side (the opposite side to the first lead wire 111a) of the curved portion 213, thereby suppressing the formation of the cracks 3 therein.

(2) The metal conductor 215 is formed thin in the thickness, in the radial direction of the curved portion 213, of the depressed portion 214. Therefore, the depressed portion 214 of the metal conductor 215 is small in bending rigidity, and easy to bend. This allows for securely heat caulking the first extended portion 211 and the first lead wire 111a, and the second extended portion 212 and the first lead wire 111a.

(3) The depressed portion 214 is formed by flattening the metal conductor 215 in the radial direction of the curved portion 213. Therefore, it is possible to form the depressed portion 214 with the easy method, without depending on a complicated method by e.g. grinding the metal conductor 215 to form the depressed portion 214.

Second Embodiment

Figure 6A:
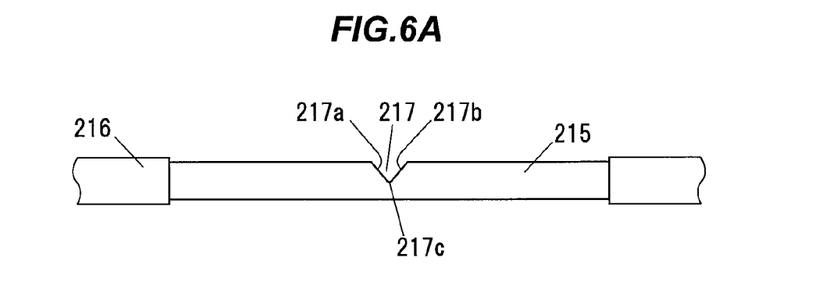
FIG. 6A is a top view showing a connecting portion of a first bus ring in a second embodiment, before formation of the connecting portion.
Figure 6B:
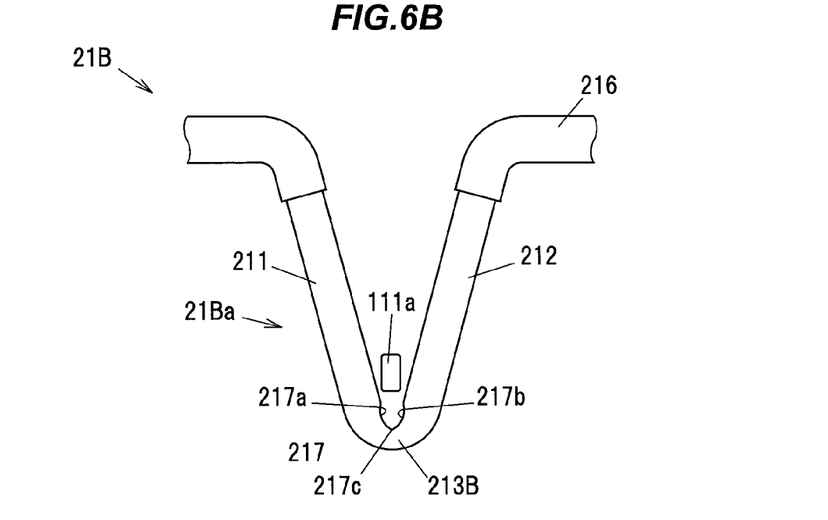
FIG. 6B is a top view showing the connecting portion of the first bus ring in the second embodiment, when a first lead wire is inserted in the connecting portion.
Figure 6C:
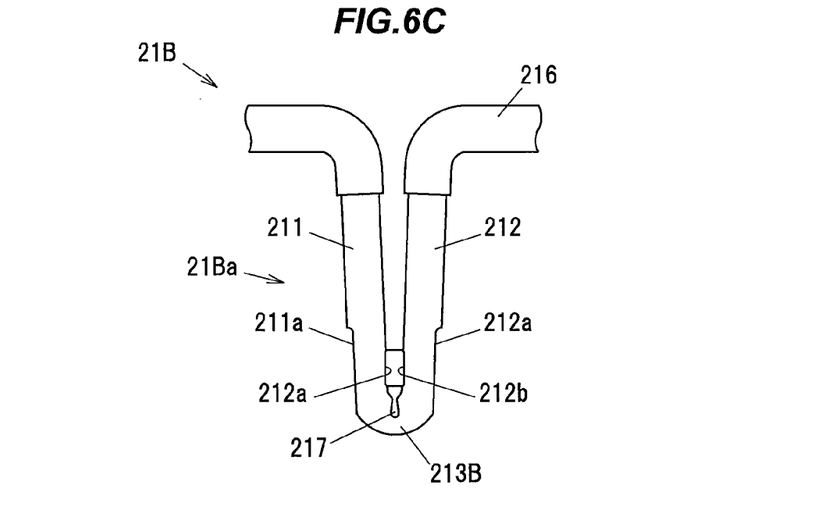
FIG. 6C is a top view showing the connecting portion of the first bus ring in the second embodiment, when the first lead wire and the connecting portion are connected together by heat caulking.

Next will be described a second embodiment according to the invention with reference to FIGS. 6A to 6C. In FIGS. 6A to 6C, elements having substantially the same functions as those described for the first embodiment are given common numerals or characters, and duplicated descriptions thereof are omitted.

FIG. 6A is a top view showing a connecting portion 21Ba of a first bus ring 21B in the second embodiment, before formation of the connecting portion 21Ba. FIG. 6B is a top view showing the connecting portion 21Ba of the first bus ring 21B in the second embodiment, when the first lead wire 111a is inserted in the connecting portion 21Ba. FIG. 6C is a top view showing the connecting portion 21Ba of the first bus ring 21B in the second embodiment, when the first lead wire 111a and the connecting portion 21Ba are connected together by heat caulking.

The connecting portion 21Ba of the first bus ring 21B in this second embodiment comprises a curved portion 213B having a depressed portion 217, which is different in shape from the depressed portion 214 of the curved portion 213 in the first embodiment. The depressed portion 217 is formed with one pair of continuous opposite tapered surfaces (first tapered surface 217a and second tapered surface 217b), and the depressed portion 217 is open toward the first lead wire 111a. In other words, the first tapered surface 217a and the second tapered surface 217b form a V shape, as shown in FIG. 6A.

The curved portion 213B is formed by bending the metal conductor 215 at a vertex 217c formed by the first tapered surface 217a and the second tapered surface 217b of the depressed portion 217. Further, when the first extended portion 211 and the second extended portion 212, and the first lead wire 111a are thermally caulked to displace the first extended portion 211 and the second extended portion 212 close to each other, the first tapered surface 217a and the second tapered surface 217b are opposite and parallel to each other.

In the same manner as the first embodiment, the first lead wire 111a and the connecting portion 21Ba are electrically connected together by heat caulking welding the first extended portion 211 and the second extended portion 212 and the first lead wire 111a.

This second embodiment has similar functions and advantageous effects to the functions and advantageous effects (1) to (3) described in the first embodiment.

Third Embodiment

Figure 7A:
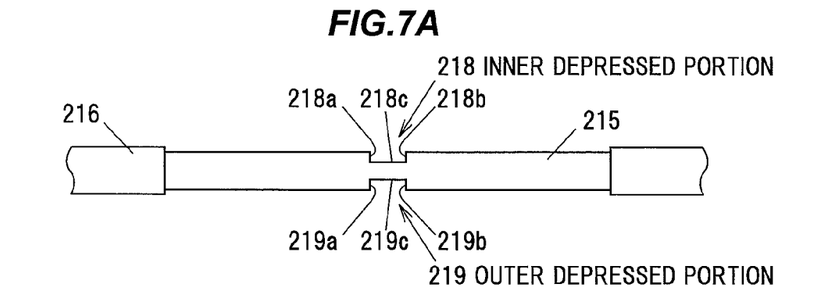
FIG. 7A is a top view showing a connecting portion of a first bus ring in a third embodiment, before formation of the connecting portion.
Figure 7B:
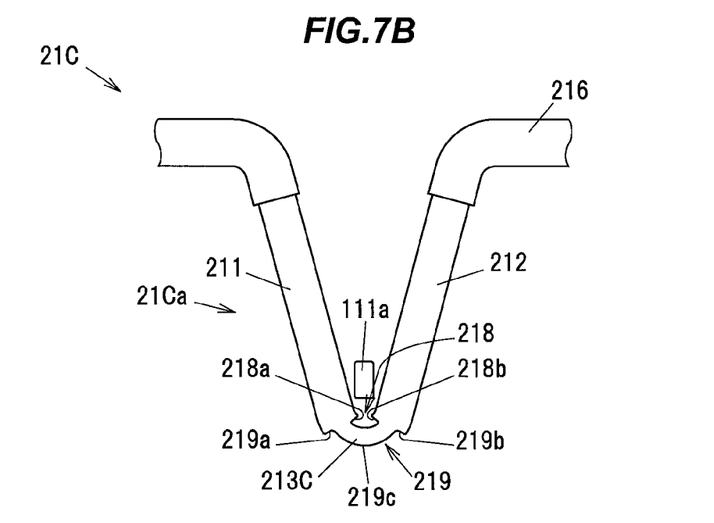
FIG. 7B is a top view showing the connecting portion of the first bus ring in the third embodiment, when a first lead wire is inserted in the connecting portion.
Figure 7C:
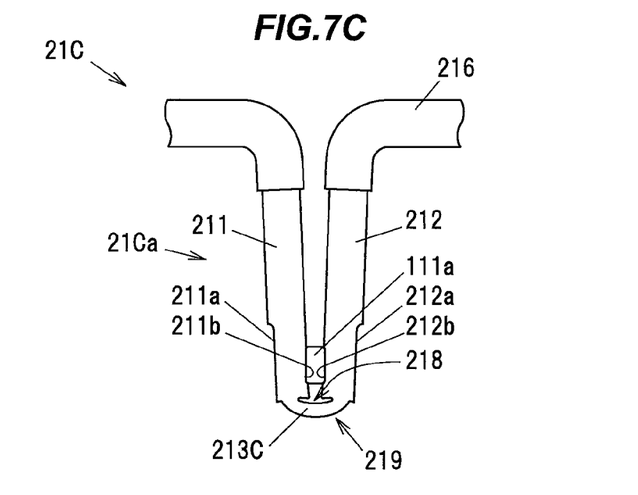
FIG. 7C is a top view showing the connecting portion of the first bus ring in the third embodiment, when the first lead wire and the connecting portion are connected together by heat caulking.

Next will be described a third embodiment according to the invention with reference to FIGS. 7A to 7C. In FIGS. 7A to 7C, elements having substantially the same functions as those described for the first embodiment are given common numerals or characters, and duplicated descriptions thereof are omitted.

FIG. 7A is a top view showing a connecting portion 21Ca of a first bus ring 21C in the third embodiment, before formation of the connecting portion 21Ca. FIG. 7B is a top view showing the connecting portion 21Ca of the first bus ring 21C in the third embodiment, when the first lead wire 111a is inserted in the connecting portion 21Ca. FIG. 7C is a top view showing the connecting portion 21Ca of the first bus ring 21C in the third embodiment, when the first lead wire 111a and the connecting portion 21Ca are connected together by heat caulking.

The connecting portion 21Ca of the first bus ring 21C in this third embodiment comprises a curved portion 213C having depressed portions 218 and 219, which are different in shape from the depressed portion 214 of the curved portion 213 in the first embodiment. The metal conductor 215 is formed with the inner depressed portion 218 and the outer depressed portion 219 in its portion to be curved to form the curved portion 213C, which are thinned in thickness in a radial direction of the curved portion 213C. The inner depressed portion 218 is arranged on the first lead wire 111a side, while the outer depressed portion 219 is arranged on the opposite side to the inner depressed portion 218.

The inner depressed portion 218 is surrounded on three sides by one pair of opposite side surfaces (first side surface 218a and second side surface 218b), and a bottom surface 218c, which is formed between the first side surface 218a and the second side surface 218b, and the inner depressed portion 218 is open toward the first lead wire 111a. The outer depressed portion 219 is surrounded on three sides by one pair of opposite side surfaces (first side surface 219a and second side surface 219b), and a bottom surface 219c, which is formed between the first side surface 219a and the second side surface 219b, and the outer depressed portion 219 is open toward the opposite side to the first lead wire 111a.

The curved portion 213C is formed by bending (curving) the metal conductor 215 at the inner depressed portion 218 being taken as the center. At this point, the first side surface 218a and the second side surface 218b of the inner depressed portion 218 are each oriented toward the bottom surface 218c. The bottom surface 218c is curved toward the first lead wire 111a to form a curved surface. On the other hand, the first side surface 219a and the second side surface 219b of the outer depressed portion 219 are each oriented outward in the radial direction of the curved portion 213C. The bottom surface 219c is curved toward the first lead wire 111a to form a curved surface.

In the same manner as the first embodiment, the first lead wire 111a and the connecting portion 21Ca are electrically connected together by heat caulking welding the first extended portion 211 and the second extended portion 212 and the first lead wire 111a.

This third embodiment has similar functions and advantageous effects to the functions and advantageous effects (1) to (3) described in the first embodiment. Incidentally, the first bus ring 21C is formed with the inner depressed portion 218 and the outer depressed portion 219, by flattening the metal conductor 215 equally from inner and outer sides in the radial direction of the first bus ring 21C. On the other hand, the first bus ring 21 in the first embodiment is formed with the depressed portion 214 by flattening the metal conductor 215 from the inner side in the radial direction of the first bus ring 21. Therefore, the third embodiment allows the area of the curved portion 213C of the metal conductor 215 to be large, as compared to the area of the curved portion 213 of the metal conductor 215 in the first embodiment. This allows for maintaining the strength of the curved portion 213C, leading to suppression of the formation of cracks therein.

Summary of the Embodiments

Next, the technical concept that is ascertained from the embodiment described above will be described with the aid of reference characters and the like in the embodiment. It should be noted, however, that each of the reference characters in the following description should not be construed as limiting the constituent elements in the claims to the members and the like specifically shown in the embodiment.

[1] An electrical collecting and distributing ring (2), comprising: an annular bus ring (first, second, third bus ring 21, 22, 23) for performing electrical collection and distribution to a polyphase winding (111, 112, 113) wound around a plurality of annularly arranged teeth (110), the bus ring (first, second, third bus ring 21, 22, 23) including a plurality of terminals (connecting portions 21a, 22a, 23a) and a plurality of circular arc portions (21b, 22b, 23b) therebetween, respectively, formed by bending a linear electrical conducting member (metal conductor 215), so that the plurality of terminals (connecting portions 21a, 22a, 23a) are connected to ends, respectively, of the winding (111, 112, 113), while being connected together in a circumferential direction by the plurality of circular arc portions (21b, 22b, 23b) therebetween, respectively, wherein the plurality of terminals (connecting portions 21a, 22a, 23a) include respective one pair of extended portions (211, 212), which extend in a radial direction of the circular arc portions (21b, 22b, 23b) to clamp the end therebetween of the winding (111, 112, 113), and a respective curved portion (213), which is formed between the respective one pair of extended portions (211, 212), wherein the electrical conducting member (metal conductor 215) is formed with depressed portions (214) in the curved portions (213), respectively, the depressed portions (214) being thinned in thicknesses in radial directions of the curved portions (213), respectively, wherein the terminals (connecting portions 21a, 22a, 23a) and the ends of the winding (111, 112, 113) are connected together by caulking the extended portions (211, 212) with the ends of the winding (111, 112, 113) clamped between the extended portions (211, 212), respectively.

[2] The electrical collecting and distributing ring according to [1] above, wherein the depressed portions (214) are formed by flattening the electrical conducting member (metal conductor 215) in the radial directions of the curved portions (213), respectively.

[3] The electrical collecting and distributing ring according to [1] above, wherein the respective one pair of extended portions (211, 212) of the terminals (connecting portions 21a, 22a, 23a) and the end therebetween of the winding (111, 112, 113) are connected together by heat caulking.

Although the embodiment of the present invention has been described above, the embodiment described above should not be construed to limit the invention in the appended claims. It should also be noted that not all the combinations of the features described in the above embodiment are essential to the means for solving the problems of the invention.

The present invention may be appropriately modified and practiced without departing from the spirit and scope thereof. For example, in the above embodiment the connecting portions 20a of the neutral phase bus ring 20 each extend outward in a radial direction of the circular arc portions 20b, but, instead, e.g., all the terminals of the neutral phase bus ring 20 and the first, second and third bus rings 21, 22 and 23 may each extend inward or outward in a radial direction of the circular arc portions.

Also, in the above described embodiment, the first, second and third bus rings 21, 22 and 23 are partially covered with the electrical insulator while the neutral phase bus ring 20 is the bare wire, but, instead, e.g., any one but not all of the first, second and third bus rings 21, 22 and 23 and the neutral phase bus ring 20 may be the bare wire.

Also, in the first and second embodiments, the depressed portions 214 or 217 are formed on the radial inner sides (the first lead wire 111a sides) of the curved portions 213 or 213B respectively, but, instead, the depressed portions 214 or 217 may be formed on the radial outer sides of the curved portions 213 or 213B respectively.

Also, in the above described embodiment, the metal conductor 215 is round in cross section shape, but, instead, e.g., it may be flat.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. An electrical collecting and distributing ring, comprising
    an annular bus ring formed from a linear conducting member for performing electrical collection and distribution to a polyphase winding wound around a plurality of annularly arranged teeth, the bus ring including a plurality of terminals and a plurality of circular arc portions therebetween, respectively, formed by bending the same linear electrical conducting member, so that the bus ring, and the plurality of terminals are a one-piece construction, the plurality of terminals are connected to ends, respectively, of the winding, while being connected together in a circumferential direction by the plurality of circular arc portions therebetween, respectively,
    wherein the plurality of terminals include respective one pair of extended portions, which extend in a radial direction of the circular arc portions to clamp the end therebetween of the winding, and a respective curved portion, which is formed between the respective one pair of extended portions,
    wherein the electrical conducting member is formed with depressed portions in the curved portions, respectively, the depressed portions being thinned in thicknesses in radial directions of the curved portions, respectively,
    wherein the terminals and the ends of the winding are connected together by caulking a pair of the extended portions from both sides with the ends of the winding clamped between the pair of the extended portions, respectively, and
    a pair of bent portions provided between the pair of the extended portions and a pair of circular arc portions adjacent to each other via the pair of the extended portions, wherein the pair of bent portions do not contact with each other after the terminals and the ends of the winding are connected together by caulking the pair of the extended portions.

2. The electrical collecting and distributing ring according to claim 1, wherein the depressed portions are formed by flattening the electrical conducting member in the radial directions of the curved portions, respectively.

3. The electrical collecting and distributing ring according to claim 1, wherein the respective one pair of extended portions of the terminals and the end therebetween of the winding are connected together by heat caulking.

4. The electrical collecting and distributing ring according to claim 2, wherein the respective one pair of extended portions of the terminals and the end therebetween of the winding are connected together by heat caulking.

* * * * *